May 29, 1934. C. H. DEERWESTER 1,960,241
SECTIONAL MULTIPLE INDICATOR WITH A COMMON DIAL
Filed March 31, 1932
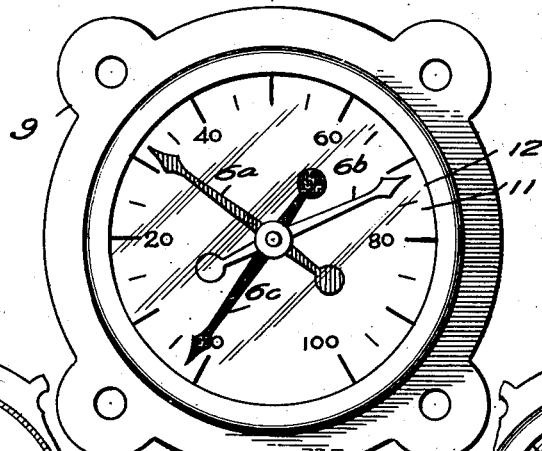
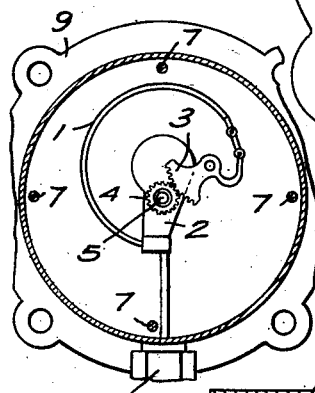
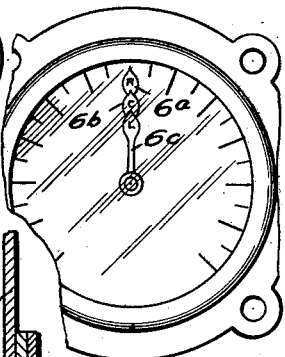
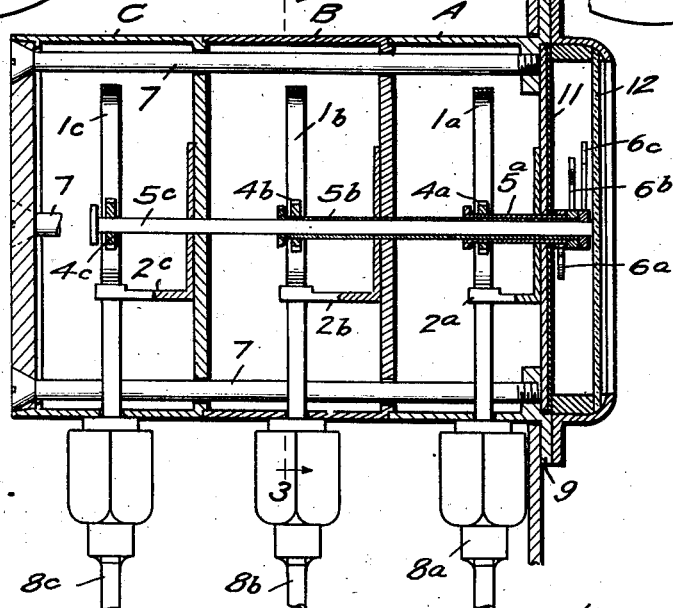
INVENTOR
CHARLES H. DEERWESTER Patented May 29, 1934

1,960,241

UNITED STATES PATENT OFFICE 1,960,241

SECTIONAL MULTIPLE INDICATOR WITH A COMMON DIAL

Charles H. Deerwester, Mills, Calif.

Application March 31, 1932, Serial No. 602,377

3 Claims. (Cl. 73—31)

(Granted under the act of March 3, 1883, as amended April 30, 1928; 370 O. G. 757)

The invention described herein may be manufactured and used by or for the Government for governmental purposes, without the payment to me of any royalty thereon.

This invention relates generally to aircraft instruments and particularly to a multiple instrument, single dial, assembly for aircraft powered by more than one engine.

The object of the invention is to conserve space on instrument boards and to allow a more practical grouping of instruments than is now possible. To this end, two or more engine instruments are combined in tandem with telescoping indicating shafts and a common dial about the face of which the respective pointers of the instruments operate.

Other objects and advantages of the invention may be apparent from the following detailed description of the device and from the novel construction, arrangement, and combination of parts, as illustrated in the accompanying drawing, wherein:

Figure 1 is a front elevation of an instrument assembly embodying the invention;

Figure 2 is a vertical longitudinal section on line 2—2 of Figure 1;

Figure 3 is a cross section on line 3—3 of Figure 2.

Figure 4 is a front view of a modification of the invention.

In multiple-motored airplanes, considerable space on the instrument board is ordinarily taken up by the installation and arrangement of the engine instruments, such as the tachometer, thermometer, pressure gauges, and fuel level gauges, due to the fact that each motor requires an individual set or group of instruments. Hence, the pilot is confronted with a multiplicity of dials variously located and of the same kind but identified with separate motors so as to instantly indicate any change in the functioning of the latter. Flying by instrument is, therefore, not only difficult but also fatiguing to the pilot of a multiple-motored airplane because of the number and kinds of engine instruments required.

By means of the present invention, however, easy reading of the instruments is greatly promoted with a consequent reduction or elimination of the fatigue incident to instrument flying as well as the conservation of the space on the instrument board. The invention is equally applicable to any and all types of engine instruments but is herein shown and described in detail as applied to an oil-pressure gauge, and consists in mounting two or more oil-pressure gauges in tandem.

The assembly shown in Figs. 1 to 3 inclusive is for a tri-motored airplane and embodies three pressure gauge units indicated at A, B, and C respectively. The mechanism of each gauge is the same, being of the Bourdon tube type as shown in Figure 3. The expansion member is a tube 1 of elliptical cross section bent into an arc of more than 180° with one end closed and the other end connected to a hollow casting 2 which serves both as a mounting for the Bourdon tube and as a connector to the oil system, the fluid of which fills the tube. When the pressure on the inside of the tube is greater than that on the outside, the free or closed end moves outward and its motion is transmitted by a sector gear 3 and pinion 4 to the pointer shaft 5.

The several pressure-gauge mechanisms are combined in a single case formed of separate sections, arranged in tandem and united in a unitary structure by means of long assembly bolts or screws 7, each section housing one of the pressure-gauge mechanisms with the flexible piping 8 from the oil system entering through the bottom of the case instead of the rear, as in present types. The front unit A is formed with attaching flanges 9 adapted to be secured to the face of the instrument board 10 suitably apertured to accommodate the device; the units A, B and C being disposed rearwardly of or behind the instrument board, as shown in Fig. 2. The several pointer-shafts of the device are telescopically arranged with the shaft 5b of the second instrument extending through the hollow shaft 5a of the first instrument and the shaft 5c of the third instrument extended through the hollow shafts of both first and second instruments. These shafts terminate adjacent to the outer or visible end of the first instrument and between the dial 11 and glass cover 12.

The dial 11 has a single set of graduations common to the instruments A, B, and C. Hence, readings for all the motors are taken from the same dial. In the position of the pointers 6a, 6b and 6c, shown in Fig. 1, the rear gauge C registers 2.5 lbs. pressure; the center gauge B registers 72 lbs.; and the front gauge A registers 32 lbs. In operation at cruising speed with motors synchronized all oil pressure systems should read approximately the same and the pointers would be superimposed one above the other. Since each gauge mechanism gives a reading for a particular motor, it may be desirable to provide some means of identifying the several pointers with their respective motors. This may be done by having the pointers differently colored, as in Fig. 1, with each color associated with a particular motor or they may be not only vari-colored but also marked, as in Fig. 4, with the letters "C", "L", and "R", for the center, left and right motors as an additional identification for the pilot. The pointers may be of the same or varying lengths.

From the foregoing, it will be apparent that the combination of several instruments of the same kind in tandem with a common dial from which the several readings are taken, not only permits the installation of the device on an instrument board within the minimum space requirements but also provides for a quick and comprehensive reading of the various gauge indications in a single glance. The invention is not limited in its application to instrument mechanisms of the Bourdon tube type but can also be applied in conformity with any of the varied mechanisms of the several engine instruments.

Having thus described the invention, what is claimed is:—

1. The combination of two or more aircraft instruments mounted in tandem with telescoping pointer shafts and a common dial about the face of which the respective pointers of the instruments operate, and separable fastening means connecting the instruments together to provide a multi-instrument assembly capable of being enlarged and reduced by the addition and removal of instruments.

2. An aviation instrument having, in combination, two or more instrument mechanisms of similar kind and function and respectively including a pointer shaft, said mechanisms being arranged in tandem with their respective shafts telescoped one within the other and terminating adjacent the outer face of the foremost instrument, a dial on the said outer face of the foremost instrument and having graduations common to all the instrument mechanisms, pointers operating over the said dial and identified to correspond with the said instrument mechanisms, each of said pointers being fixed to the shaft of its corresponding instrument mechanism, and separable fastening means connecting the several instrument mechanisms together to provide a multi-instrument assembly capable of being enlarged and reduced by the addition and removal of instrument mechanisms.

3. An aviation instrument comprising an instrument case composed of separate sections arranged in tandem and respectively housing a pressure-gauge mechanism including a pointer-operating shaft, a dial on the visible outer face of an end section and having graduations common to the pressure gauge mechanisms of all the sections, said pressure gauge mechanisms being independently actuated and having their respective pointer-operating shafts telescopically arranged and terminating forwardly of the dial of the dial-bearing end section, pointers on the respective shafts, and separable fastening means releasably securing the said sections together.

CHARLES H. DEERWESTER.